(12) United States Patent
Stavely et al.

(10) Patent No.: US 7,262,798 B2
(45) Date of Patent: Aug. 28, 2007

(54) SYSTEM AND METHOD FOR SIMULATING FILL FLASH IN PHOTOGRAPHY

(75) Inventors: Donald J Stavely, Windsor, CO (US); K Douglas Gennetten, Ft. Collins, CO (US); David K. Campbell, Loveland, CO (US); Paul M Hubel, Mt View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1023 days.

(21) Appl. No.: 09/955,457

(22) Filed: Sep. 17, 2001

(65) Prior Publication Data

US 2003/0052991 A1    Mar. 20, 2003

(51) Int. Cl.
*H04N 5/20* (2006.01)
(52) U.S. Cl. .................. 348/255; 348/140; 348/223.1; 348/229.1; 348/353; 348/362; 348/370; 348/371; 396/63; 396/65

(58) Field of Classification Search ............. 348/223.1, 348/353, 207.1, 370, 254, 140, 371, 229.1, 348/362, 348, 354, 255; 396/61–70, 222, 396/234
See application file for complete search history.

(56) References Cited

U.S. PATENT DOCUMENTS

| | | | | |
|---|---|---|---|---|
| 4,641,942 A | * | 2/1987 | Sakai et al. ................... 396/96 |
| 4,782,396 A | * | 11/1988 | Park ............................ 348/353 |
| 5,515,448 A | * | 5/1996 | Nishitani ..................... 382/106 |
| 5,550,587 A | * | 8/1996 | Miyadera ................. 348/223.1 |
| 5,563,658 A | * | 10/1996 | Parulski et al. ............. 348/350 |
| 5,617,141 A | * | 4/1997 | Nishimura et al. ......... 348/366 |
| 5,808,681 A | * | 9/1998 | Kitajima ..................... 348/371 |
| 6,021,209 A | * | 2/2000 | Hirabayashi et al. ....... 382/103 |
| 6,067,114 A | * | 5/2000 | Omata et al. ............... 348/345 |

* cited by examiner

*Primary Examiner*—Lin Ye
*Assistant Examiner*—Chriss S Yoder, III

(57) ABSTRACT

A digital camera simulates the use of fill flash. The camera takes a series of photographs of a scene at various focus distances. The photographs are stored, along with their corresponding focus distances. The photographs are analyzed to determine the distance to objects at various locations of the scene. Regions of a final photograph are selectively adjusted in brightness based on the distance information to simulate the effect that would have resulted had fill flash been used.

24 Claims, 9 Drawing Sheets

SYSTEM AND METHOD FOR SIMULATING FILL FLASH IN PHOTOGRAPHY

FIELD OF THE INVENTION

The present invention relates generally to photography and more specifically to the simulation of the use of a flash or strobe light.

BACKGROUND OF THE INVENTION

Photographers often use a flash or strobe light to achieve desired effects in their photographs. Many modem cameras include a built-in electronic flash lamp so that the use of flash is convenient. Sometimes, the flash is used to provide the primary illumination of a scene when insufficient light is available from other sources. The light that is available from other sources is often called ambient light.

In some cases, there may be sufficient ambient light for exposing a photograph without the use of a flash, but the distribution of the ambient light is such that the resulting photograph is disappointing. This is often the case with brightly backlit subjects such as a person in a relatively dark room with a sunlit window in the background. The camera may adjust its exposure settings to the average brightness of the scene, thereby severely underexposing the person.

A technique for improving photographs in this situation is the use of fill flash. Fill flash is the use of a flash or strobe light, usually built into or mounted on the camera, to add light to a scene that may have enough ambient light for a photograph, but which can be improved by the use of the flash. In the above example, the camera flash can boost the illumination of the person but will have a negligible effect on the brightness of the sunlit objects outside the window. In this way, the relative illumination of the person and the outdoor objects are brought more closely together, allowing for better relative exposure of the various parts of the scene.

Fill flash may be used for other purposes as well. Fill flash can add highlight emphasis to foreground subjects. It can also be used to soften harsh shadows that may be present, for example when people being photographed are lit by strong near-overhead sunlight.

While fill flash can improve the quality of photographs in some situations, it has several disadvantages. In some situations, such as in museums, flash photography may not be allowed. In other circumstances, such as at a wedding or formal dinner, flash photography may be considered impolite.

Fill flash may also create some undesirable shadow effects. For example, when a person is photographed using flash, one side of the person may be limned in the photograph by a harsh and objectionable shadow falling on objects just behind the person.

Electronic flash also consumes significant electrical energy. Using the camera flash may rapidly deplete the batteries powering the camera, thereby limiting the useful life of the camera between battery replacements or rechargings.

Electronic flash can also produce an undesirable effect called "redeye" when the light from the flash is reflected back to the camera from the retina of the subject's eye. Methods of reducing the "redeye" effect such as using a preflash to constrict the iris of the subject add undesirable delay in the shutter response of the camera.

And finally, with some cameras the user must decide before taking a photograph whether to use fill flash or not. Heretofore, the effect of flash could not be easily added or removed after the photograph is taken. While some cameras can automatically decide whether to use fill flash, photographs taken by an automated camera are still subject to all of the other disadvantages of fill flash. Furthermore, the photographer may disagree with the camera's decision and wish for a way to modify the result.

What is needed is a camera that can add or adjust the effects of fill flash after a photograph is taken, can provide the beneficial effects of fill flash while avoiding the undesirable effects, and can gain the benefits of fill flash in situations where flash photography may not be used.

SUMMARY OF TITLE INVENTION

A camera system simulates fill flash by determining distances from the camera to objects in a scene, taking a photograph of the scene without using a flash, and selectively adjusting the brightness of regions of the photograph based on the distance information.

DETAILED DESCRIPTION OF THE PREFERRED EMBODIMENT

Figure 1:
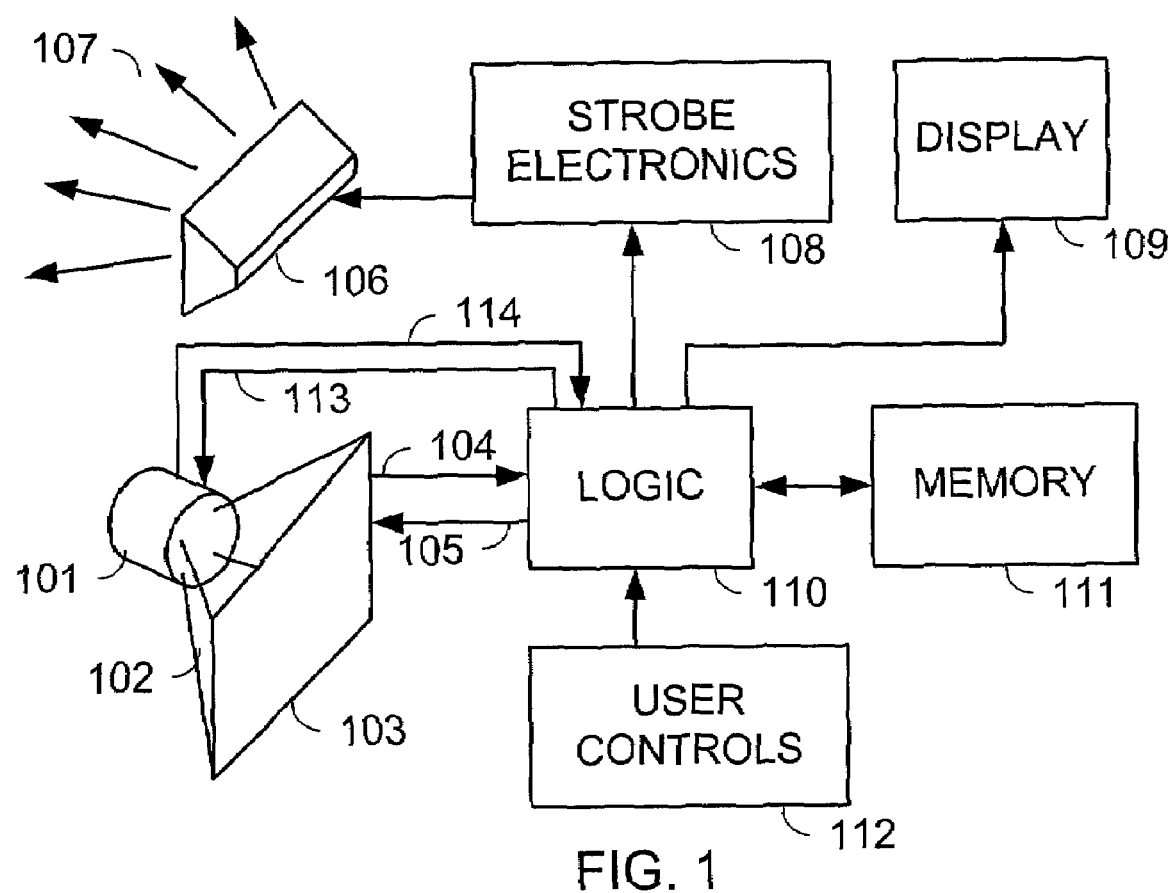
FIG. 1 is a simplified block diagram of a digital camera.

FIG. 1 shows a block diagram of a digital camera. The lens (101) gathers light from a scene (not shown). The gathered light is redirected (102) to form an image of the scene on a sensor (103). The sensor may be an array of CCD elements, CMOS sensors, or the like. The operation of a focusing mechanism, which may include all or part of the lens (101) may be controlled by control signals (113) from a logic unit (110) which may contain a microprocessor system. Feedback signals (114) indicating the position of the focusing mechanism may flow from the lens (101) to the logic unit (110). Likewise the operation of the sensor may be controlled by control signals (105) from logic unit (110). Image information signals (104) flow from the sensor to the logic unit (110). A flash, or strobe (106) may be utilized to supply additional light (107) to the scene. The strobe is operated by the strobe electronics (108), which in turn are controlled by the logic unit (110). The camera may comprise a display (109) on which image data may be shown. The camera may comprise a memory (111) for storage and recall of image data, as well as data interchange with other devices (not shown). The user of the camera may operate various control inputs (112) in order to affect the operation of the camera.

The focusing mechanism of a digital camera which embodies the present invention may be controllable by the camera logic unit (110). The lens (101) or a portion of the lens may be moved axially under the control of logic unit (110) to achieve a focusing action such that the logic unit (110) knows the position of the focusing mechanism when a photograph is taken. Alternatively, the position of the sensor (103) could be adjusted under control of the logic unit (110) to achieve a focusing action. Optionally, feedback signals may be provided to the logic unit (110) by the focusing mechanism to directly indicate the position of the focusing mechanism. Combined with embedded knowledge of the optical properties of the lens (101) and the design of the camera, the position of the focusing mechanism reveals the distance from the camera at which objects are in focus.

A digital camera by its nature produces a numerical representation of each photograph it takes. For each location in the photograph, called a "picture element" or "pixel", the camera records a numerical value indicating the brightness of the scene at that location. The resulting representation of the scene is then an array of numbers. Locations in the array correspond to specific pixels, or locations in the scene, and the number stored at each array location represents the scene brightness at that location. Optionally, the camera may also record information about the color at each pixel location of the scene being photographed. For example, many cameras represent the color of a pixel using three components indicating the contribution of red, green, and blue wavelengths of light to the brightness of that pixel. The overall brightness of a pixel may be computed as the sum of the red, green, and blue contributions, as a weighted sum, or as some other combination of the color information. A variety of methods for computing the brightness of a pixel from color information are well known in the art. It will be readily apparent to those skilled in the art that the present invention applies both to cameras that record only brightness information about each pixel and to cameras that also record color information.

For the purposes of this disclosure, a photograph may be a numerical representation of a scene captured by a camera, and need not be a printed representation of the scene.

Figure 2:
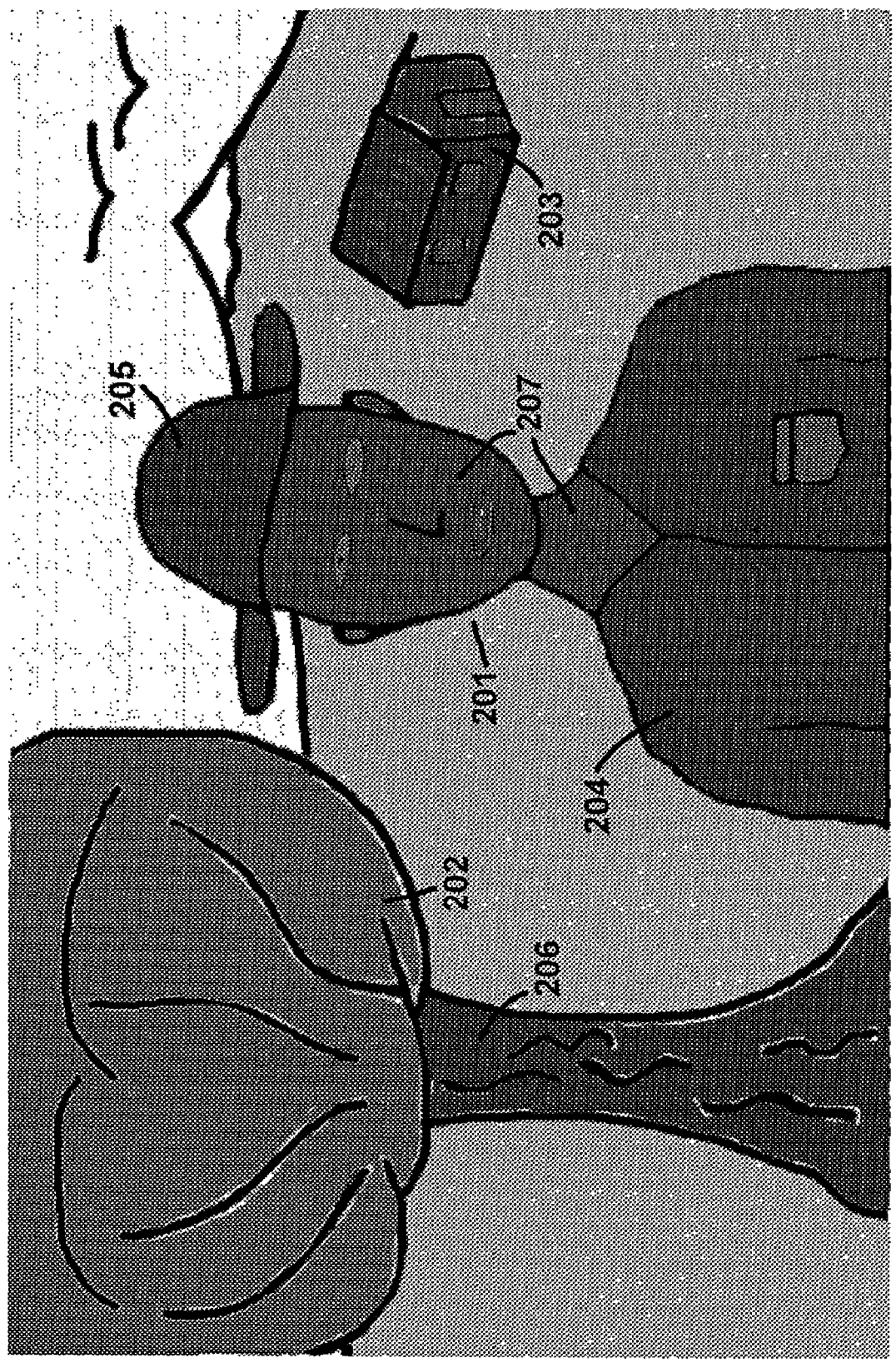
FIG. 2 depicts a scene to be photographed

FIG. 2 is a schematic representation of a scene that will be used to illustrate an embodiment of the invention. In the scene, a person (201) is standing near the camera in the shadow of a tree (202). The tree (202) is farther from the camera than the person (201), but still only a moderate distance away. In the background of the scene are other objects including a house (203). The background objects are much farther from the camera then the person (201) or the tree (202). Several objects in the scene, notably the person's shirt (204) and hat (205), the tree trunk (206), and the house (203) appear to be the same brightness.

This scene provides an example of a scene which could be improved by the use of fill flash. While the overall exposure of the scene is well balanced, the person (201) in the foreground appears darker than the photographer may prefer because the ambient light at that location is insufficient. Photographers often wish to render some skin tones in a photograph at a perceptual brightness roughly halfway between black and white. In this rendition, the skin tones (207) of the person (201) are much darker, perceptually about 25% of the way between black and white.

To take an improved photograph in accordance with an embodiment of the invention, the camera first takes several trial photographs of the scene in rapid succession, each photograph focused at a different distance from the camera, and records the focus distance for each photograph (902, 903). The camera adjusts the position of the focusing mechanism for each photograph to achieve the changes in focus distance. These trial photographs may be taken using camera settings which minimize the camera's depth of field, as is well known in the art. The term "depth of field" refers to the range of distances from the camera in which objects will be in acceptable focus. The series of trial photographs are stored in the camera's memory (111).

Figure 3:
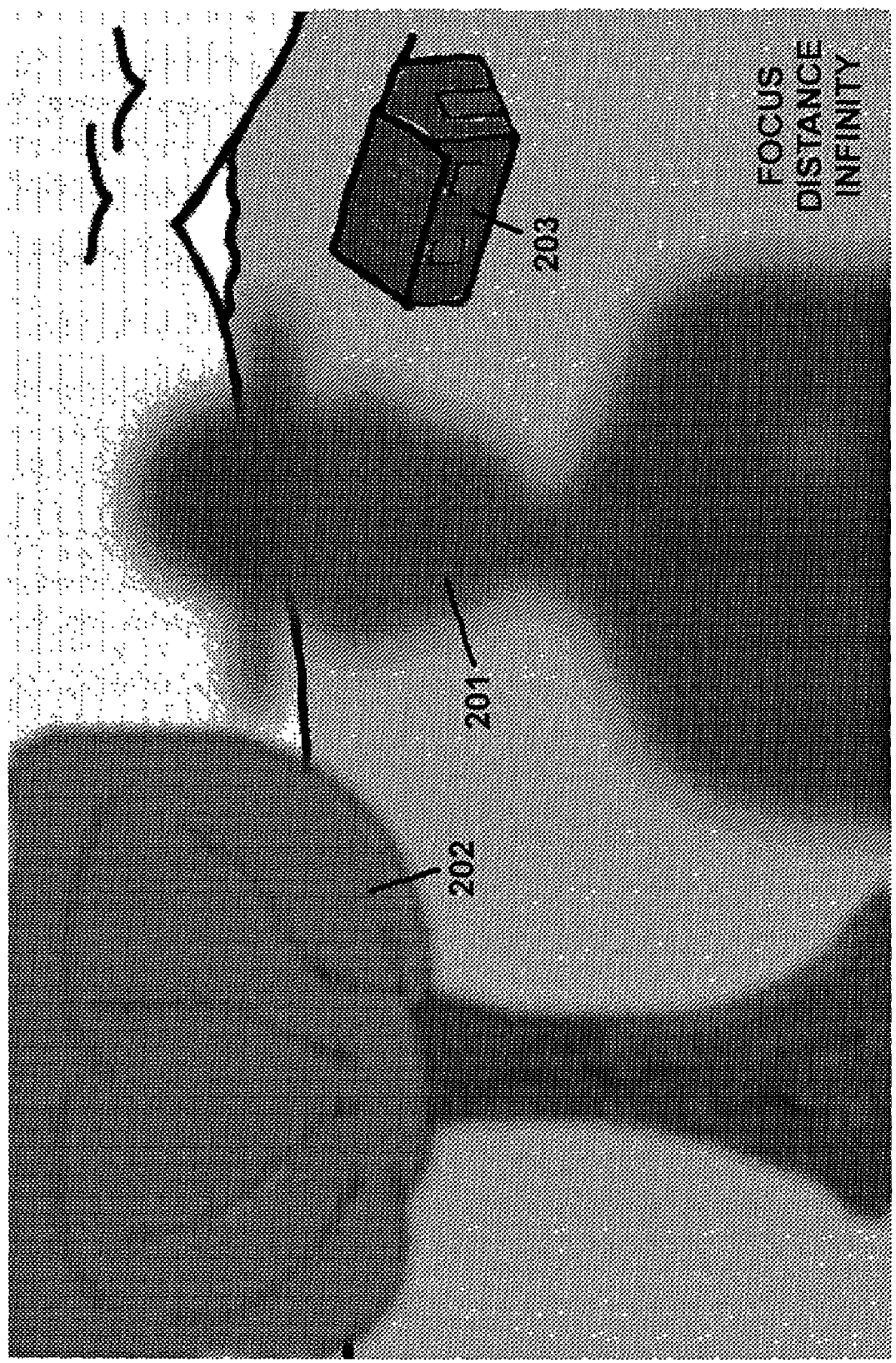
FIG. 3 is a depiction of a photograph of the scene in FIG. 2 taken with the camera set to focus on distant objects.
Figure 4:
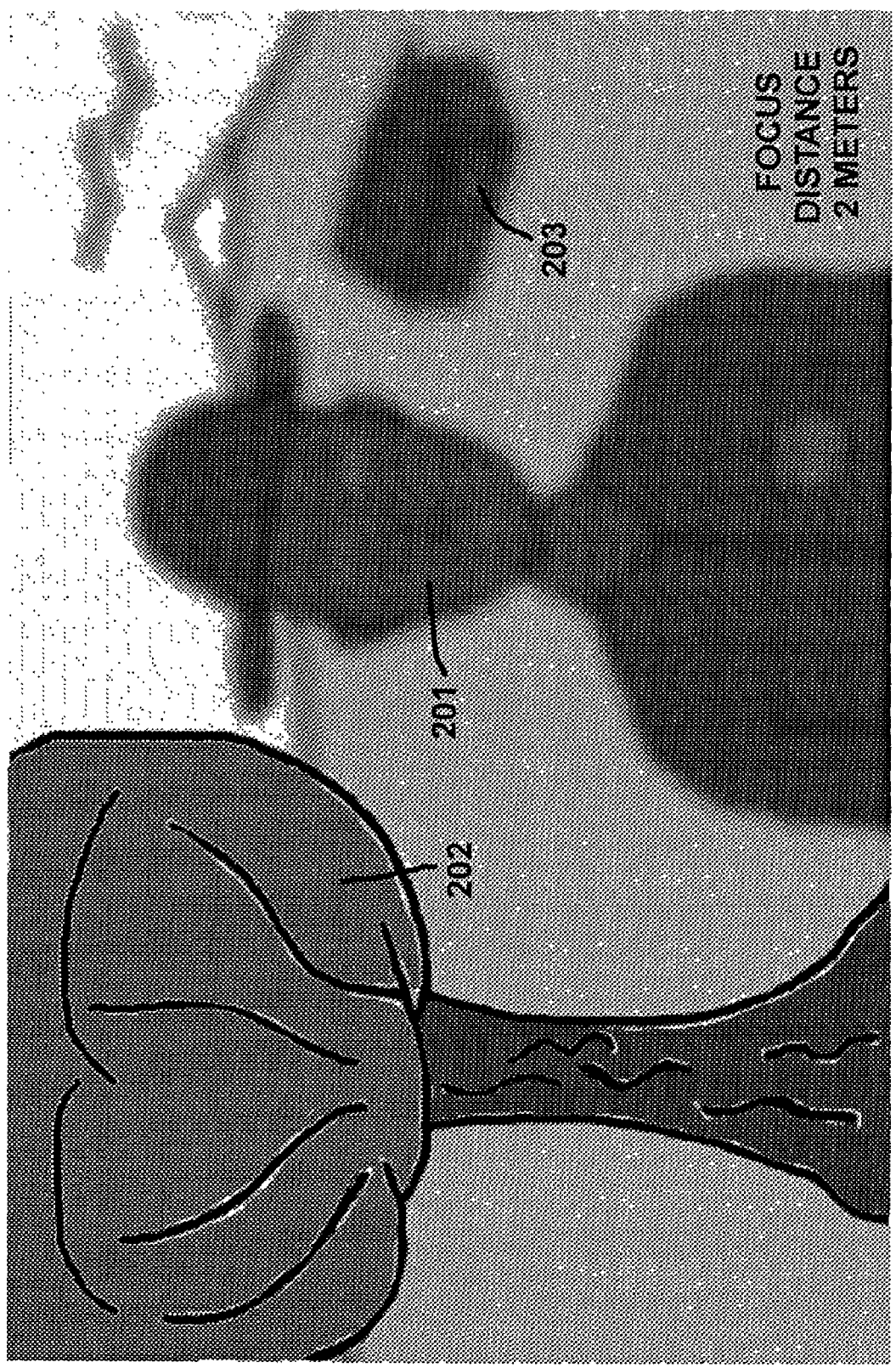
FIG. 4 is a depiction of a photograph of the scene in FIG. 2 taken with the camera set at an intermediate focus distance.
Figure 5:
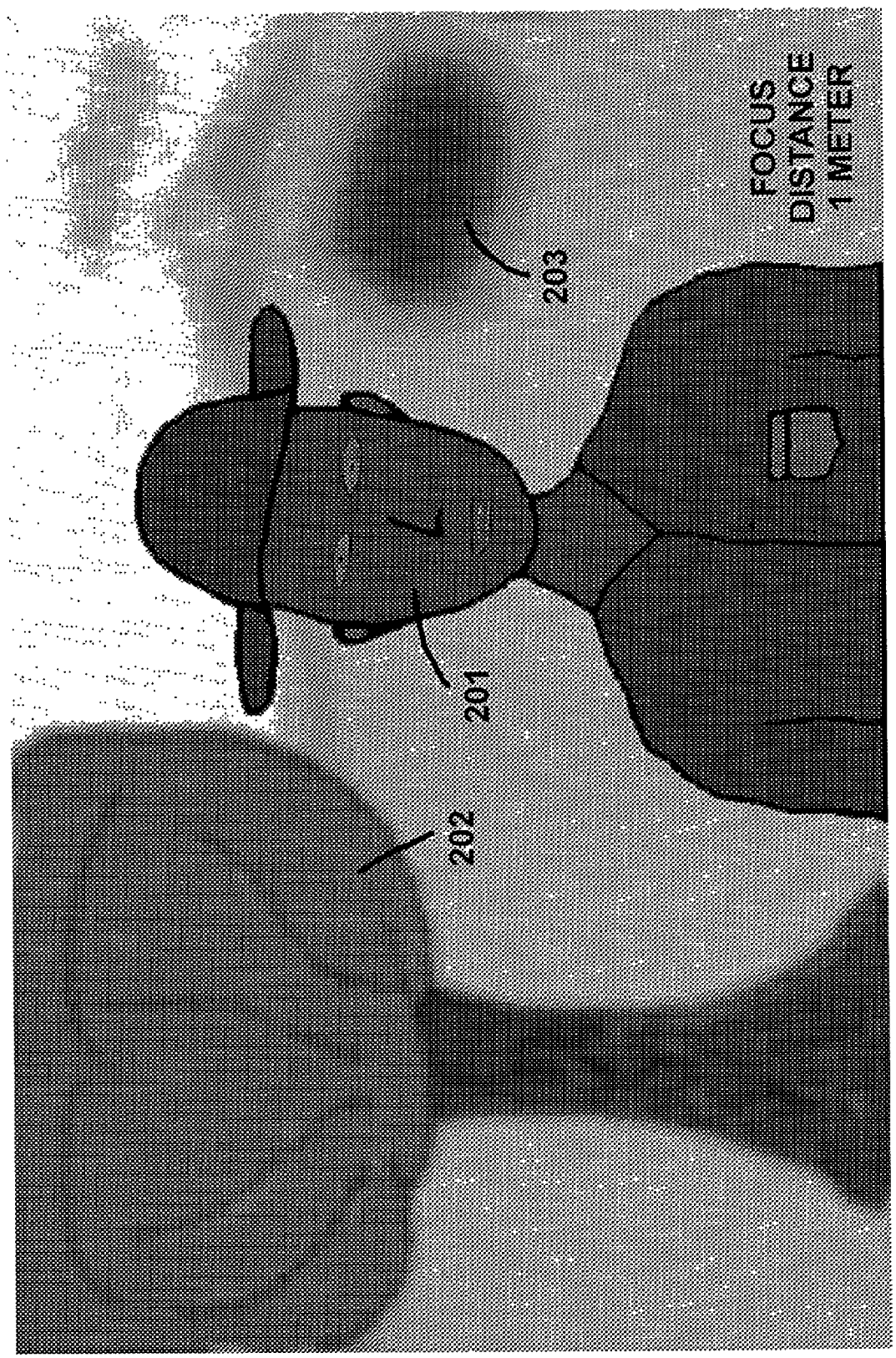
FIG. 5 is a depiction of a photograph of the scene in FIG. 2 taken with the camera set to focus on close objects.

FIGS. 3 through 5 show three of a possible series of photographs of the scene shown in FIG. 2 using different focus mechanism settings. Depending on the design of the camera, a complete series of trial photographs may contain more or fewer than three photographs. Three example photographs have been chosen here for illustration.

FIG. 3 shows the scene of FIG. 2 as it might be photographed when the camera focus mechanism is set to focus on very distant objects and the camera is configured for minimum depth of field. In FIG. 3, objects which are far from the camera, including the house (203), are sharply focused. Tree (202) is an intermediate distance from the camera, and is somewhat out of focus. The person (201) is relatively close to the camera and is correspondingly very unfocused. Stored (903) with the photograph of FIG. 3 is the notation that it was taken using a camera focus distance of essentially infinity as was determined by combining the focus mechanism position information with knowledge of the optical properties of the lens (101).

FIG. 4 shows the scene of FIG. 2 as it might be photographed when the camera focus mechanism is set to focus on objects two meters from the camera and the camera is configured for minimum depth of field. In FIG. 4, objects which are far from the camera, including the house (203), are somewhat unfocused. Tree (202) is an intermediate distance from the camera, and is sharply focused. The person (201) is relatively close to the camera and is correspondingly somewhat unfocused. Stored (903) with the photograph of FIG. 3 is the notation that it was taken using a camera focus distance of two meters.

FIG. 5 shows the scene of FIG. 2 as it might be photographed when the camera focus mechanism is set to focus on objects one meter from the camera and the camera is configured for minimum depth of field. In FIG. 5, objects which are far from the camera, including the house (203), are very unfocused. Tree (202) is an intermediate distance from the camera, and is correspondingly somewhat unfocused. The person (201) is relatively close to the camera and is sharply focused. Stored (903) with the photograph of FIG. 3 is the notation that it was taken using a camera focus distance of one meter.

Once the series of trial photographs is stored in the camera's memory, the camera's logic unit (110) may analyze (904) the series of photographs to determine in which of the series each region of the scene is best focused. Alternatively, the series of photographs could be transmitted to a computer and the analysis performed there. An external computer used to perform the analysis could be embedded in another device such as a printer.

Figure 6:
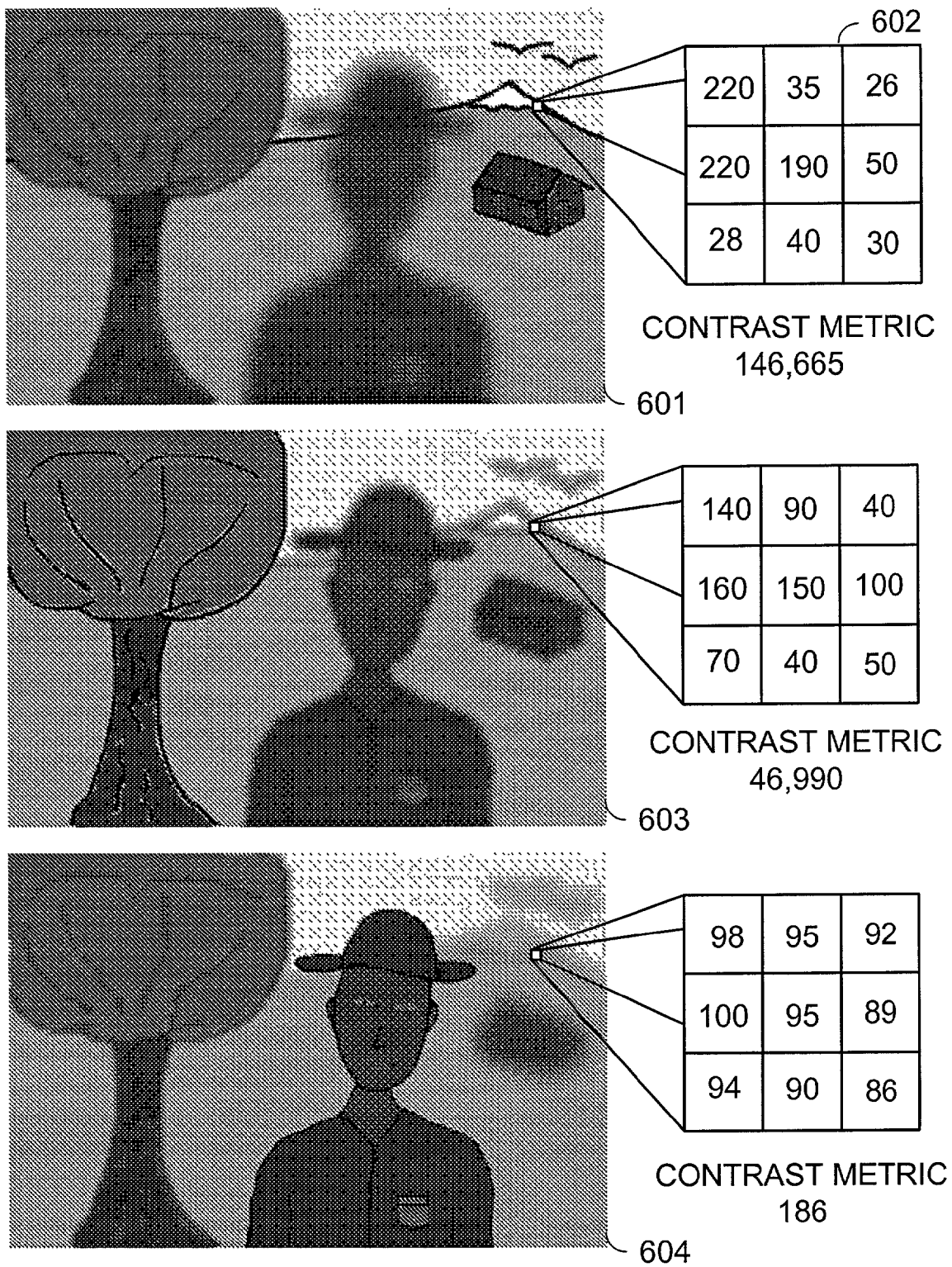
FIG. 6 is a diagram showing the construction of spatial contrast metrics from three different photographs.

For each location in the scene and for each trial photograph, a spatial contrast metric is calculated (905). As is well known in the art, spatial contrast in a photograph is a useful measure of focus. FIG. 6 shows the computation of a spatial contrast metric for a particular location in the example scene for each of the three example trial photographs. For example, using the trial photograph with a focus distance of essentially infinity (601), a table (602) is shown which lists the pixel brightness values that might be found at the location in the photograph indicated. In the table (602) we see that the center pixel of the region has a brightness value of 190, while the surrounding pixels have other brightness values.

One way to compute a spatial contrast metric at a pixel is to sum the squares of the differences between the brightness value of a pixel and the brightness values of surrounding pixels. Using this method, higher values of the spatial contrast metric indicate sharper focus. Using the values given in the table (602), the spatial contrast metric is calculated as Spatial Contrast Metric=$(220-190)^2+(35-190)^2+(26-190)^2+(220-190)^2+(50-190)^2+(28-190)^2+(40-190)^2+(30-190)^2=146,665$ Using this approach with the same area of the trial photograph taken with a focus distance of two meters (603), a spatial contrast metric of 46,990 is found, indicating that area of the scene is less sharply focused in photograph (603) than in photograph (601).

Similarly, the same area of the trial photograph taken with a focus distance of one meter (604) yields a spatial contrast metric of 186, indicating that this area of the photo is very unfocused.

It will be appreciated by those skilled in the art that this method of computing a spatial contrast metric serves as an example, and that many methods exist in the field.

Using the spatial contrast metrics computed for this particular location in all three trial photographs, it is determined that this particular location is best focused in the photograph focused at essentially infinity (906). Therefore, objects at that location in the scene are a large distance from the camera.

Figure 7:
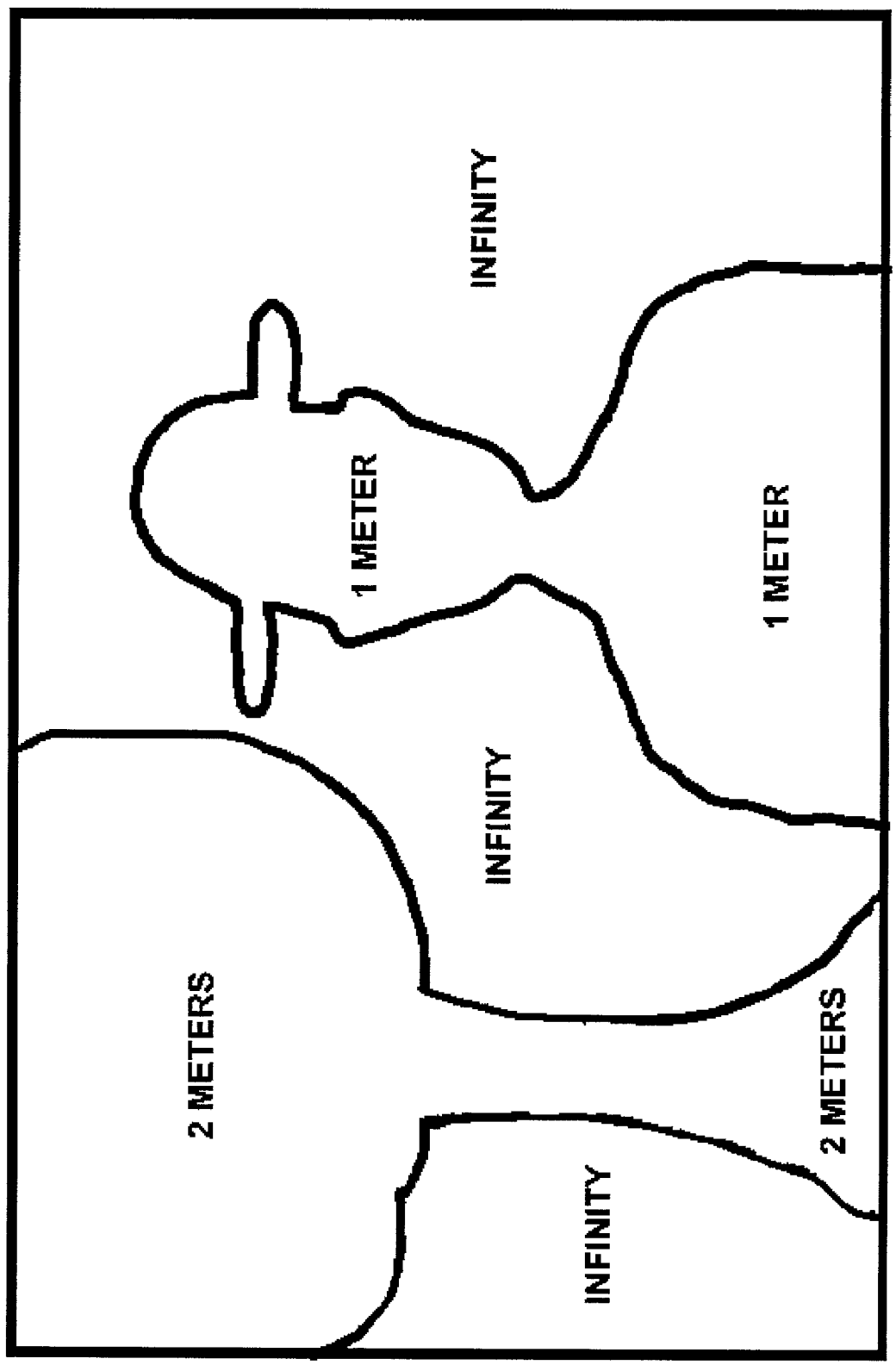
FIG. 7 is a distance map of the scene in FIG. 2.

Applying this technique to all locations of the trial photographs (906), a distance map can be constructed. FIG. 7 shows the resulting distance map for the example scene. In this simplified example, three regions emerge. One region contains objects about one meter from the camera. Another region contains objects about two meters from the camera. A final region contains objects a relatively large, essentially infinite, distance from the camera. While the distance map shown in FIG. 7 is a convenient tool for conceptualizing part of the process the camera uses to simulate fill flash, the camera need not necessarily construct the entire distance map simultaneously.

Using this distance information, the camera or external computer can simulate the effect that fill flash would have had on the photograph, had fill flash been used. To implement the simulation (909), software or firmware in the camera or computer simply modifies the numerical values stored in memory representing the brightness values of pixels in the photograph.

A flash mounted on a camera may be modeled as essentially a point source of light which illuminates the scene being photographed in accordance with the well-known inverse square law. That is, the brightness of the illumination falling on an object due to the flash is inversely proportional to the square of the distance from the camera to the object. For example, the brightness of the illumination on an object two meters from the camera will be one fourth the brightness of the illumination on an object one meter from the camera. Of course, the inverse square law applies only to light coming from the camera flash, which has an additive effect with ambient light falling on the scene.

One useful capability enabled by the invention is that the user of the camera may apply a variable amount of simulated fill flash to a photograph after the photograph is taken. It is not necessary to estimate the flash energy required prior to taking the photograph. The camera may display the photograph on its display (109) and allow the user to adjust the simulated fill flash effect using the camera controls (112) while viewing the effect on the display (109). A similar control could be provided if the analysis and simulation are performed on a computer external to the camera.

In the example case, the user may choose to apply enough fill flash effect so that the skin tones (207) of the person (201) are rendered in the photograph at a perceptual brightness level halfway between black and white. The user selects a fill flash amount which results in the skin tones (207) of the person (201) being rendered in the eventual final photograph at the appropriate perceptual brightness level. The camera uses this fill flash amount information along with the distance map of the scene to render other objects in the photograph as if their illumination were also affected by the same fill flash which would have resulted in the proper exposure of the skin tones (207) of the person (201).

For example, the shirt (204) and hat (205) worn by the person (201) in the scene will be lightened in the final photograph by an amount similar to the skin tones (207) of the person (201), but will still be rendered somewhat darker than the skin tones (207) by virtue of being of somewhat darker materials.

The tree (202) in the scene is farther from the camera, and thus will be less affected by the simulated fill flash in accordance with the inverse square law. The tree (202) will be lightened, but proportionally less than the shirt (204) and hat (205) of the person (201). In particular, the tree bark (206) which appeared the be the same brightness as the shirt (204) and hat (205) in the trial photograph shown in FIG. 2, will be substantially darker in the final photograph than the shirt (204) and hat (205) of the person (201).

Objects that are far from the camera will essentially not be affected by a camera flash, and thus the fill flash simulation will leave their brightness levels unaffected. In particular, the house (203) will appear as the same brightness level in the final photograph as in FIG. 2.

Thus several objects which appeared as the same brightness in the scene of FIG. 2, the shirt (204) and hat (205), the tree bark (206) and the house (203) will appear as three different brightness levels in the final photograph which includes the simulation of fill flash by virtue of their being different distances from the camera.

Once all locations in the photograph requiring adjustment are complete, the camera stores a final photograph including the simulated fill flash effects. The final photograph may be derived from one of the trial photographs already taken, or from another photograph taken with preferred camera settings (908). For example, the final photograph may be taken with the camera configured to maximize its depth of field and then the fill flash simulation applied.

Figure 8:
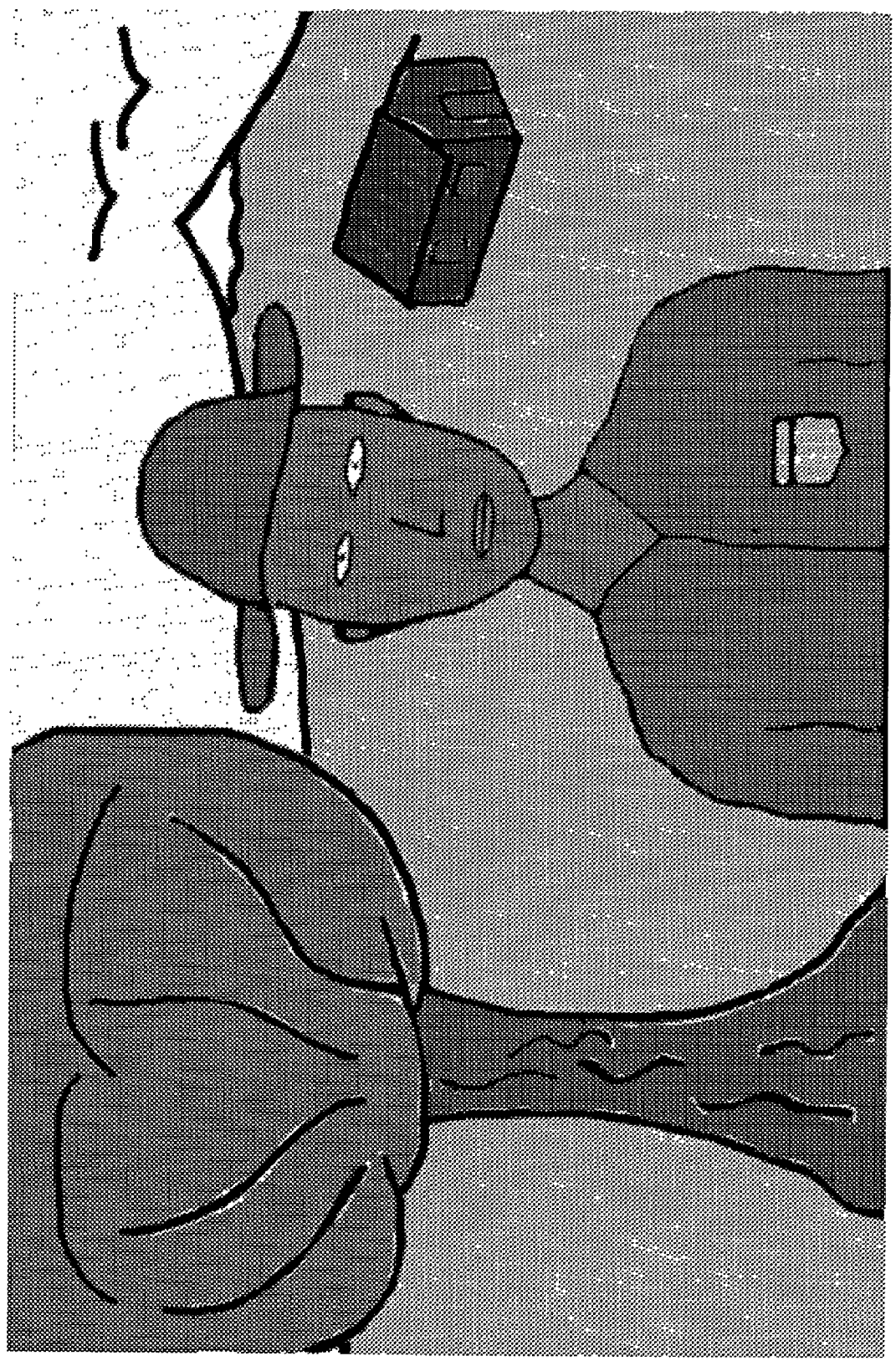
FIG. 8 is a depiction of a photograph of the scene in FIG. 2 after simulated fill flash has been applied in accordance with an embodiment of the invention.
Figure 9:
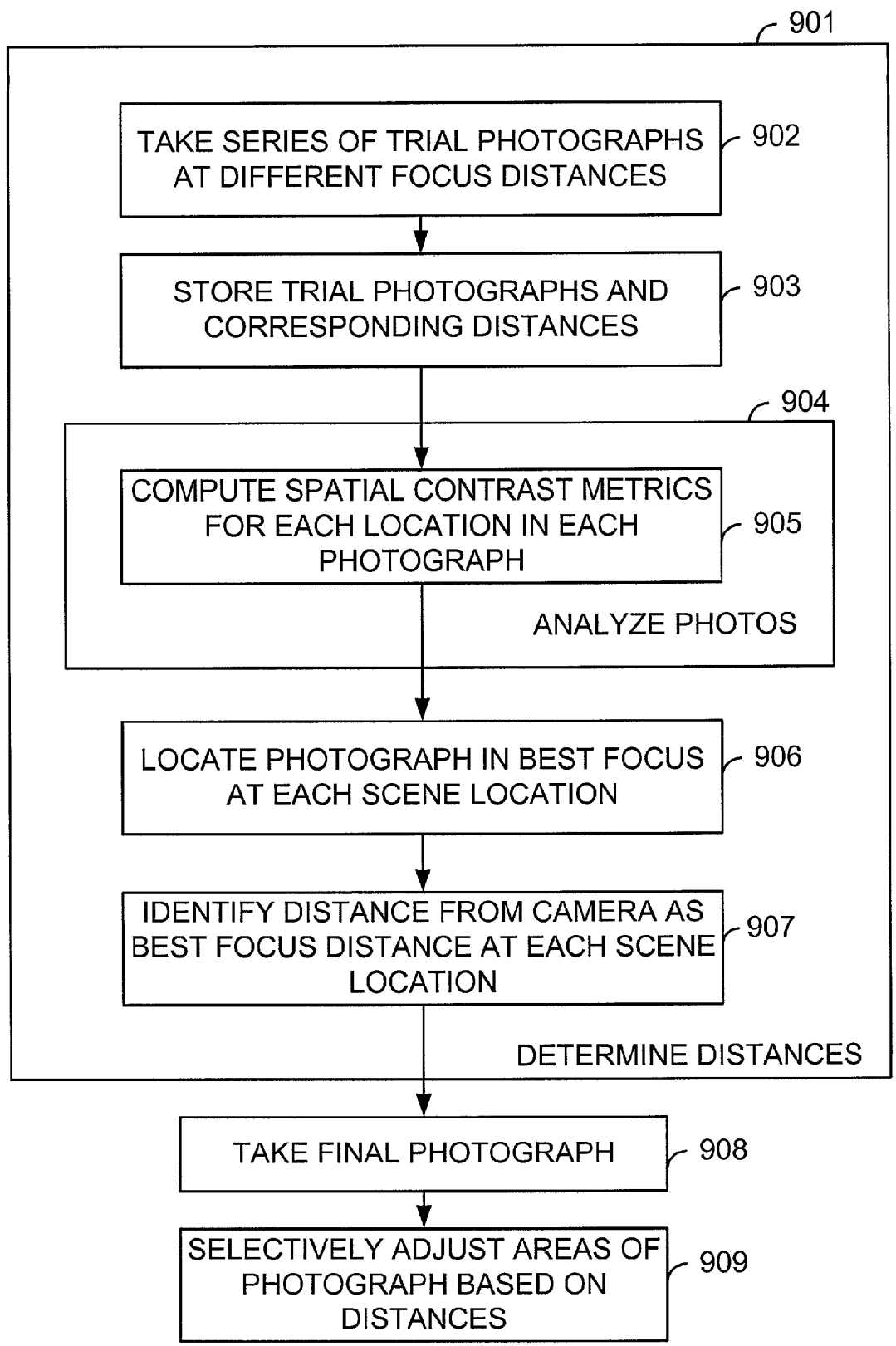
FIG. 9 is a diagram showing the steps for implementing an embodiment of the invention.

FIG. 8 shows a final photograph as it might appear after the application of simulated fill flash in accordance with an embodiment of the invention.

In the example case described, the fill flash simulation was accomplished by lightening parts of the photograph. It should be noted that in photographing other scenes such as a brightly backlit subject, the use of fill flash may interact with a camera's exposure determination methods. While foreground subjects will be brighter in relation to distant subjects in the resulting photograph, the result may be that some regions of a photograph appear darker when fill flash is used than they would if flash were not used. It is intended that the present invention encompass this situation.

It will be appreciated that simulating fill flash in accordance with the example embodiment of the invention has several advantages over the use of actual fill flash. The desirable effects of fill flash such as correction for a backlit subject may be obtained using the simulated fill flash, but many of the disadvantages of actual fill flash may be eliminated. Simulated fill flash may be used in situations where a camera flash may be disallowed or considered rude. Simulated fill flash may be applied after the photograph is taken, and the strength of the fill flash effect may be adjusted to the user's taste. The simulated fill flash conserves battery capacity because the camera flash may not be used. In fact, the simulated fill flash may not consume any additional battery capacity, as the camera may gather the necessary trial photographs during the course of its automatic focus determination. Simulated fill flash does not create an objectionable dark shadow on background surfaces limning foreground subjects, and does not produce the "redeye" effect in subject's eyes.

The foregoing description of the present invention has been presented for purposes of illustration and description. It is not intended to be exhaustive or to limit the invention to the precise form disclosed, and other modifications and variations may be possible in light of the above teachings. For example, a simulated fill flash need not be constrained to perform in accordance with the inverse square law, as is an actual flash. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of simulating fill flash in a camera system comprising the steps of:
   determining distances from the camera to objects in a scene;
   taking a photograph of the scene without using a flash; and
   selectively adjusting the brightness of regions of the photograph based on the distance information.

2. The method of claim 1 wherein determining the distances from the camera to objects in the scene comprises:
   taking a series of photographs with the camera configured to focus on objects at various distances from the camera; and
   analyzing the series of photographs and corresponding focus distances.

3. The method of claim 2 wherein the analysis of the series of photographs comprises computing a spatial contrast metric.

4. The method of claim 3 wherein determining the distances to objects at locations in the scene further comprises:
   locating the particular photograph in the series of photographs with the spatial contrast metric indicating that objects at that location in the scene are more nearly in focus in that particular photograph than in any other in the series of photographs; and
   identifying the distance from the camera to objects at that location in the scene as the focus distance stored in connection with that particular photograph.

5. The method of claim 2, wherein one of the series of photographs taken in determining the distances from the camera to objects in the scene is used as the photograph in which the brightness of regions is selectively adjusted.

6. The method of claim 1 wherein regions containing objects closer to the camera are lightened in the resulting photograph in relation to regions containing objects farther from the camera.

7. The method of claim 6 wherein regions are modified in the resulting photograph in accordance with the inverse square law.

8. The method of claim 1, further comprising varying the amount of brightness adjustment in response to a user control.

9. The method of claim 8, wherein the user control is comprised in the camera.

10. The method of claim 8, further comprising displaying the effect of the brightness adjustment on a display.

11. The method of claim 10, wherein the display is comprised in the camera.

12. A camera system which simulates fill flash by:
    determining distances from the camera to objects in a scene;
    taking a photograph of the scene without using a flash; and
    selectively adjusting the brightness of regions of the photograph based on the distances.

13. The camera system of claim 12 wherein the determining the distances from the camera to objects in the scene comprises:
    taking a series of photographs with the camera configured to focus on objects at various distances from the camera; and
    analyzing the series of photographs and corresponding focus distances to determine the object distances.

14. The camera system of claim 13, further comprising a computer separate from the camera, and wherein the series of trial photographs and their focus distances are transmitted to the separate computer for analysis and the simulation of fill flash.

15. The camera system of claim 13 wherein the analysis of the series of photographs comprises computing a spatial contrast metric.

16. The camera system of claim 13 wherein determining the distances to objects at locations in the scene further comprises:
    locating the particular photograph in the series of photographs with the spatial contrast metric indicating that objects at that location in the scene are more nearly in focus in that particular photograph than in any other in the series of photographs; and
    identifying the distance from the camera to objects at that location in the scene as the camera focus distance stored in connection with that particular photograph.

17. The camera system of claim 13, wherein one of the series of photographs taken in determining the distances from the camera to objects in the scene is used as the photograph in which the brightness of regions is selectively adjusted.

18. The camera system of claim 12 wherein the system lightens regions containing objects closer to the camera in the resulting photograph in relation to regions containing objects farther from the camera.

19. The camera system of claim 18 wherein the system modifies the brightness of regions in the resulting photograph in accordance with the inverse square law.

20. The camera system of claim 12, wherein the camera system further simulates fill flash by varying the amount of brightness adjustment in response to a user control.

21. The camera system of claim 20, wherein the user control is comprised in the camera.

22. The camera system of claim 12, wherein the camera system further simulates fill flash by displaying the effect of the brightness adjustment on a display.

23. The camera system of claim 22, wherein the display is comprised in the camera.

24. A camera, comprising:
means for determining distances from the camera to objects in a scene;
means for taking a photograph without using a flash; and
means for selectively modifying the brightness of regions in the resulting photograph based on the distances.

* * * * *

UNITED STATES PATENT AND TRADEMARK OFFICE
CERTIFICATE OF CORRECTION

PATENT NO. : 7,262,798 B2
APPLICATION NO. : 09/955457
DATED : August 28, 2007
INVENTOR(S) : Donald J Stavely et al.

Page 1 of 1

It is certified that error appears in the above-identified patent and that said Letters Patent is hereby corrected as shown below:

In column 1, line 13, delete "modem" and insert -- modern --, therefor.

In column 2, line 13, delete "TITLE" and insert -- THE --, therefor.

Signed and Sealed this

Twenty-eighth Day of April, 2009

JOHN DOLL
*Acting Director of the United States Patent and Trademark Office*